(12) United States Patent
Zittel

(10) Patent No.: US 6,263,785 B1
(45) Date of Patent: *Jul. 24, 2001

(54) BLANCHER AND METHOD OF OPERATION

(76) Inventor: David R. Zittel, 155 Oak Grove Dr., Columbus, WI (US) 53925

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,228

(22) Filed: Jun. 9, 1998

(51) Int. Cl.[7] .............................. A23L 3/00; A23N 12/00; A47J 37/12; F25D 25/02
(52) U.S. Cl. ................................ 99/348; 99/355; 99/360; 99/404; 99/443 C; 99/470; 99/517; 134/65; 134/132; 426/510; 426/523
(58) Field of Search .............................. 99/348, 352–355, 99/360–365, 403–418, 450, 470, 483, 487, 516, 517, 534, 536, 477–479, 443 R, 443 C; 366/81, 91, 101, 102, 234, 290, 318–322, 324; 134/65, 132; 62/381; 100/117, 145; 426/510, 511, 520, 523

(56) References Cited

U.S. PATENT DOCUMENTS

| | | |
|---|---|---|
| D. 274,852 | 7/1984 | Withers, Sr. et al. . |
| D. 274,853 | 7/1984 | Withers, Sr. et al. . |
| 887,628 | 5/1908 | Hall . |
| 2,556,385 | 6/1951 | Allan . |
| 2,781,070 | 2/1957 | Kilburn et al. . |
| 3,316,829 | 5/1967 | Foldenauer . |
| 3,352,338 | 11/1967 | Hirahara et al. . |
| 3,491,679 | 1/1970 | Kelly . |
| 3,498,208 | 3/1970 | Longe et al. . |
| 3,501,213 | 3/1970 | Trexler . |
| 3,736,860 | 6/1973 | Vischer, Jr. . |
| 3,778,521 | 12/1973 | Fisher et al. . |
| 3,880,068 | 4/1975 | Goodale . |
| 3,910,175 | 10/1975 | Smith . |
| 3,938,283 | 2/1976 | Keith, Jr. . |
| 3,982,481 | 9/1976 | Console et al. . |
| 3,983,259 | 9/1976 | Maior . |
| 3,988,011 | 10/1976 | Kressin . |
| 3,993,788 | 11/1976 | Longenecker . |
| 4,008,210 | 2/1977 | Steele et al. . |
| 4,026,035 | 5/1977 | Dyer et al. . |
| 4,045,152 | 8/1977 | Peterson et al. . |
| 4,045,881 | 9/1977 | Brandt et al. . |
| 4,081,367 | 3/1978 | Hulls et al. . |
| 4,086,368 | 4/1978 | Bosley et al. . |
| 4,092,911 | 6/1978 | Goodale . |
| 4,104,410 | 8/1978 | Malecki . |
| 4,111,110 | 9/1978 | Smith . |
| 4,121,509 | 10/1978 | Baker et al. . |
| 4,176,010 | 11/1979 | Dudek et al. . |

(List continued on next page.)

Primary Examiner—Timothy Simone
(74) Attorney, Agent, or Firm—Nilles & Nilles SC

(57) ABSTRACT

A rotary blancher having a food product receiving chamber sealed substantially everywhere except at its food product inlet and food product outlet to permit operation using solely a non-liquid heat transfer medium that is a gas or vapor that preferably is steam. To minimize loss of heat transfer medium out the inlet and outlet, some atmosphere preferably is vented. Preferably, the blancher can also use a liquid heat transfer medium or liquid and non-liquid heat transfer combined media. During operation, food product is introduced into the chamber and a rotary food transport mechanism urges the food product toward the outlet. The heat transfer medium is introduced into the chamber where it comes into contact with the food product. After heating the food product to the desired temperature, the food product is removed from the blancher. Preferably, food product is blanched in this manner in a continuous flow process.

41 Claims, 11 Drawing Sheets

U.S. PATENT DOCUMENTS

| | | |
|---|---|---|
| 4,190,577 | 2/1980 | Steele et al. . |
| 4,198,273 | 4/1980 | Dudek et al. . |
| 4,214,330 | 7/1980 | Thorsen . |
| 4,272,553 | 6/1981 | Bengtsson et al. . |
| 4,300,367 | 11/1981 | Thorsen . |
| 4,300,447 | 11/1981 | Hoover . |
| 4,302,888 | 12/1981 | Boldt . |
| 4,329,375 | 5/1982 | Holloway, Jr. et al. . |
| 4,338,344 | 7/1982 | Brooks et al. . |
| 4,369,586 | 1/1983 | Wedel . |
| 4,384,412 | 5/1983 | Chance et al. . |
| 4,387,630 | 6/1983 | Timbers et al. . |
| 4,407,840 | 10/1983 | Lathrop et al. . |
| 4,427,643 | 1/1984 | Fowler . |
| 4,432,275 | 2/1984 | Zekert et al. . |
| 4,466,987 | 8/1984 | Wilkins et al. . |
| 4,471,002 | 9/1984 | Buckholz, Jr. et al. . |
| 4,478,860 | 10/1984 | Hekal et al. . |
| 4,489,737 | 12/1984 | Wochnowski . |
| 4,493,250 | 1/1985 | Smith . |
| 4,498,249 | 2/1985 | Cooke et al. . |
| 4,505,230 | 3/1985 | Caplin . |
| 4,513,759 | 4/1985 | Wochnowski et al. . |
| 4,514,094 | 4/1985 | Buckholz, Jr. et al. . |
| 4,514,431 | 4/1985 | Buckholz, Jr. et al. . |
| 4,516,334 | 5/1985 | Wanke . |
| 4,525,370 | 6/1985 | Parkes . |
| 4,529,609 | 7/1985 | Gaehring et al. . |
| 4,534,118 | 8/1985 | Cabus et al. . |
| 4,563,364 | 1/1986 | Carmichael et al. . |
| 4,590,688 | 5/1986 | Steffero, Sr. . |
| 4,597,976 | 7/1986 | Doster et al. . |
| 4,604,948 | 8/1986 | Goldhahn . |
| 4,606,136 | 8/1986 | Pflug . |
| 4,615,924 | 10/1986 | Hekal et al. . |
| 4,688,476 | 8/1987 | Zittel . |
| 4,702,161 | 10/1987 | Andersen . |
| 4,748,038 | 5/1988 | Lewis et al. . |
| 4,756,916 | 7/1988 | Dreher et al. . |
| 4,770,236 | 9/1988 | Kulikowski . |
| 4,796,523 | 1/1989 | Mette . |
| 4,829,890 | 5/1989 | Thomson . |
| 4,853,248 | 8/1989 | Würsch et al. . |
| 4,875,344 | 10/1989 | Zittel . |
| 4,879,129 | 11/1989 | Thomson . |
| 4,923,710 | 5/1990 | van der Marel . |
| 4,933,411 | 6/1990 | Gifford . |
| 4,938,987 | 7/1990 | Gannis et al. . |
| 4,942,810 | 7/1990 | Zittel et al. . |
| 4,971,821 | 11/1990 | McIntyre . |
| 4,984,587 | 1/1991 | Neville . |
| 5,002,802 | 3/1991 | Gannis et al. . |
| 5,039,534 | 8/1991 | Adams et al. . |
| 5,058,478 | 10/1991 | Mendenhall . |
| 5,073,393 | 12/1991 | Defrancisci . |
| 5,073,400 | 12/1991 | Bruno et al. . |
| 5,080,918 | 1/1992 | Beauvais . |
| 5,084,291 | 1/1992 | Burrows et al. . |
| 5,095,794 | 3/1992 | Mendenhall . |
| 5,098,135 | 3/1992 | Timm . |
| 5,109,612 | 5/1992 | Timm . |
| 5,126,154 | 6/1992 | Beauvais . |
| 5,133,249 | 7/1992 | Zittel . |
| 5,146,841 | 9/1992 | Zittel . |
| 5,217,688 * | 6/1993 | Von Lerner ............................ 422/26 |
| 5,226,677 | 7/1993 | Peter et al. . |
| 5,249,861 | 10/1993 | Thomson . |
| 5,270,015 | 12/1993 | Rochelle et al. . |
| 5,275,541 | 1/1994 | Becker et al. . |
| 5,289,759 | 3/1994 | Hufford . |
| 5,327,817 | 7/1994 | Zittel . |
| 5,329,842 | 7/1994 | Zittel . |
| 5,341,729 | 8/1994 | Zittel . |
| 5,360,118 | 11/1994 | Kempf et al. . |
| 5,361,689 | 11/1994 | Lima et al. . |
| 5,393,544 | 2/1995 | Hannah et al. . |
| 5,427,015 | 6/1995 | Zittel . |
| 5,429,041 | 7/1995 | Zittel . |
| 5,433,849 | 7/1995 | Zittel . |
| 5,433,964 | 7/1995 | Norman et al. . |
| 5,456,091 | 10/1995 | Zittel . |
| 5,498,438 | 3/1996 | Strong et al. . |
| 5,504,119 | 4/1996 | Hopkins, Jr. . |
| 5,504,120 | 4/1996 | Hopkins, Jr. et al. . |
| 5,533,549 | 7/1996 | Sherman . |
| 5,592,869 | 1/1997 | Zittel . |
| 5,607,712 | 3/1997 | Bourne . |
| 5,632,195 | 5/1997 | Zittel . |
| 5,730,836 | 3/1998 | Greig et al. . |
| 5,752,431 | 5/1998 | Zittel . |
| 5,755,880 | 5/1998 | Norman et al. . |
| 5,786,018 | 7/1998 | Toh . |
| 5,802,961 | 9/1998 | Hay et al. . |
| 5,865,536 * | 2/1999 | Mechias ............................ 99/348 X |
| 5,957,041 * | 9/1999 | Fosbol et al. ........................ 99/483 |

\* cited by examiner

BLANCHER AND METHOD OF OPERATION

FIELD OF THE INVENTION

The present invention relates to rotary blanchers and more particularly to a rotary blancher capable of solely using heated vapor or gas as a heat transfer medium and a method of heating, blanching or cooking using a rotary blancher with a heated vapor or gas heat transfer medium.

BACKGROUND OF THE INVENTION

A wide variety of food products, such as pasta, beans, corn, peas, and other vegetables and fruit, are processed by blanching prior to being frozen, packaged and shipped. Generally, there are two types of industrial blanchers: the steam belt blancher, as exemplified by U.S. Pat. No. 4,942, 810, issued Jul. 24, 1990 to Zittel, et al., and the rotary blancher, examples of which are disclosed in U.S. Pat. No. 5,146,841, issued Sep. 15, 1992 to Zittel, and U.S. Pat. No. 5,632,195, issued May 27, 1997 to Zittel. The steam belt blancher uses a conveyor belt to move food products through a substantially steam-tight chamber to subject the food product to a continuous, controlled temperature treatment in steam. Although the steam belt blancher has the advantage of using only steam, which is known to be a more efficient heat transfer medium than hot water, it suffers from having a great many moving parts, and is expensive and relatively slow in operation.

Conventional prior art rotary blanchers typically use hot water, or a combination of hot water injected with steam as the heat transfer medium. However, because rotary blanchers churn and tumble the food product through a turbulent hot water bath, they are capable of processing a larger volume of food product at greater speed than a comparably sized steam belt blancher. In addition, rotary blanchers are often further favored over steam belt blanchers because rotary blanchers are less expensive and can be more reliable because they have fewer moving parts.

In a rotary blancher, food product is introduced into an inlet end of an elongate cylindrically shaped drum, which is rotatably mounted in a generally cylindrical, open-top tank. The tank is fitted with a cover for enclosing the drum and can be opened for maintenance and cleaning. The drum has a helical auger running lengthwise through the drum that rotates during operation for transporting the food product from the drum inlet opening on one end to an outlet or discharge opening at the other end. The drum cylinder has sidewalls that are perforated to contain the food product in the drum while allowing the heat transfer medium to come in contact with the food product as it is transported by the auger through the drum. As the food product moves from the inlet end of the tank to the outlet end, the time it remains in the tank, its residency time, is controlled to ensure that the food product is blanched or cooked properly.

While rotary blanchers have been improved in many ways, it has been believed to be heretofore impractical to blanch or cook only using steam because steam leakage would be substantial and render it too costly. Prior art rotary blanchers have been at best only partially steam-tight. It is known that at least one prior art rotary blancher has a spaced apart pair of steam-tight water seals located where the tank and cover meet with each seal extending longitudinally the length of the tank. Each water seal consists of a trough carried by the tank that is partially filled with water for receiving one of the longitudinal edges of the tank cover.

Such seals are effective at preventing the escape of steam along the longitudinal sides of the tank. However, significant amounts of steam still can escape along the seam where the cover and tank meet at both ends of the blancher where there are no seals. In addition, steam can escape through the openings for the drum journals in the tank and tank cover endwalls, since there is clearance around the drum journals to allow the drum to rotate freely. Steam can also escape from the drum inlet and outlet openings where food product is introduced and discharged since both are open to the atmosphere.

To prevent moisture from escaping from inside the blancher, some atmosphere within the blancher is continuously vented to help create a negative pressure within the blancher. For example, for a blancher having a diameter of 5 feet and a length of 24 feet, about 1,500 cubic feet per minute/hour of atmosphere would typically be evacuated from inside the blancher during operation. Despite this, some moisture and steam still leak from the blancher. Moreover, while this rate of venting is suitable to safely minimize increasing the humidity of the plant in which the blancher is operating using either water or a combination of water and steam, it is not suitable to prevent or suitably minimize steam leakage where such a rotary blancher is using only steam as the heat transfer medium.

While a small amount of steam leakage does not present a significant problem in the case of conventional hot water operation, as steam is used to a greater extent to achieve higher temperatures and more rapid heat transfer, steam leakage becomes a significant problem. Loss of steam, of course, will result in loss of energy. One of the major expenses involved in blanching food product is the cost of energy needed for generating the steam or heating the water used to blanch the food product. In addition, if steam is allowed to escape into the factory it can condense and drip onto food product which can result in its contamination and loss. Moreover, increased humidity in the factory caused by the escape of significant amounts of steam can contribute to worker fatigue, and will result in generally unpleasant working conditions, slippery and hazardous factory floors, and accelerated corrosion of food processing equipment within the factory. Minimizing the amount of steam that escapes from the blancher is thus highly desirable.

Rotary blanchers using only steam as a heat transfer medium are believed to be capable of blanching food product as much as 10–20% faster than prior art rotary hot water or combined water and steam blanchers. However, due to the problems noted above, it has not heretofore been commercially achievable.

What is needed, therefore, is a rotary blancher that is sufficiently steam-tightly sealed so as to enable the rotary blancher to heat, blanch or cook using only steam. What is also needed is a blancher having a vent that can be controlled to draw excess steam out of the blancher at an appropriate rate so it will not escape from the drum inlet and outlet. What is still further needed is a rotary blancher that is capable of operating using a wide variety of heat transfer media including (1) water, (2) another liquid heat transfer medium, (3) a combination of water and steam, (4) a combination of another liquid heat transfer medium and a heated vapor, (5) only a heated vapor of another heat transfer medium, or (6) steam.

SUMMARY OF THE INVENTION

A blancher constructed and arranged to be sealed everywhere except at its food product inlet and food product outlet to permit operation using solely a non-liquid heat transfer medium that is a gas or vapor. In a preferred embodiment of the blancher, it is constructed so as to permit operation using (1) a liquid heat transfer medium that preferably is water, (2) a combination of at least two heat transfer media that preferably is water and steam, as well as (3) the non-liquid heat transfer medium that preferably is steam. To prevent loss of heat transfer medium or heated vapor through both the food product inlet and the food product outlet, some atmosphere is vented from the blancher during operation. Throughout this specification, heat transfer medium is utilized to define any of the above types of liquid, gas, vapor, or combined heat transfer media.

The blancher comprises a food product receiving chamber that has a food product transport mechanism received in the food product receiving chamber that urges the food product received in the food product receiving chamber toward the food product outlet. The blancher further includes a gas or vapor heat transfer medium inlet that preferably is a manifold or the like having at least one opening inside the blancher through which the heat transfer medium is introduced. Where a manifold is used, the manifold preferably is a perforated pipe or the like.

The food product receiving chamber of the blancher preferably comprises a tank and a lid that has an open position permitting access to the interior of the chamber and a closed position where the lid overlies and contacts the tank. A seal is disposed between the lid and tank when the lid is closed to prevent leakage from the food product receiving chamber.

In a preferred embodiment, both the tank and lid have a pair of spaced apart sidewalls and spaced apart endwalls that each terminate at an edge. When the lid is disposed in the closed position, the lid sidewall edges mate with the tank sidewall edges and the lid endwall edges mate with the tank endwall edges. The seal is disposed between the tank and lid sidewall edges and the tank and lid endwall edges when the lid is closed.

The food product inlet is located at one end of the food product receiving chamber and the food product outlet is located at the other end of the chamber. The food product inlet preferably comprises an arcuate cutout in one of the lid endwalls and an arcuate cutout in one of the tank endwalls that forms a generally round opening in the endwalls at one end of the blancher. The food product outlet preferably comprises an arcuate cutout in the other of the lid endwalls and an arcuate cutout in the other of the tank endwalls that forms a generally round opening in the endwalls at the other end of the blancher.

The food transport mechanism is of rotary construction. In its preferred embodiment, the food transport mechanism is an auger in the food product receiving chamber that rotates to urge food product received in the chamber toward the outlet. Preferably, the auger is received in a drum inside the food product receiving chamber. In its preferred embodiment, the drum is perforated so that food product received in the drum is immersed in the heat transfer medium during blancher operation.

During operation, the drum preferably also rotates during operation. Preferably, each journal also rotates during operation. Preferably, the auger, drum and journals rotate substantially in unison during operation.

There is a journal at each end of the drum that extends outwardly from the drum. Each journal defines a passage into the interior of the drum. The drum is received within the food product receiving chamber such that one of the journals is in communication with the food product inlet and the other of the journals is in communication with the food product outlet.

In a preferred arrangement, the drum is received within the food product receiving chamber with one of the journals preferably extending through one of the openings in the endwalls that defines generally the food product inlet and the other of the journals preferably extending through the other of the openings in the endwalls that defines generally the food product outlet. To prevent loss of heat transfer medium between the drum journals and the endwalls, there is a seal disposed between each journal and the endwalls. Preferably, each seal comprises an upper journal seal disposed between each journal and the lid endwalls and a lower journal seal disposed between each journal and the tank endwalls.

To create at least a slight negative pressure differential between the atmosphere inside the blancher and the atmosphere outside the blancher, some atmosphere within the blancher is vented during blancher operation. The atmosphere is vented through a vent pipe or the like that preferably is connected to the lid. The negative pressure differential preferably minimizes and preferably substantially prevents atmosphere including heat transfer medium from flowing out the food product inlet and food product outlet during blancher operation.

In its preferred embodiment, the blancher further includes an inlet in communication with the food product receiving chamber, preferably the tank, that enables a liquid heat transfer medium to be introduced into the chamber. The blancher preferably also includes a discharge in communication with the chamber, preferably also the tank, that permits liquid heat transfer medium to be discharged from the blancher.

During operation, food product is introduced into the food product receiving chamber. As the food product transport mechanism urges the food product toward the food product outlet, liquid or vapor heat transfer medium is introduced into the chamber heating the food product. After heating, the food product is removed from the chamber by the food product being discharged through the food product outlet. Preferably, the food product is heated until it is blanched or cooked.

Preferably, food product and the heat transfer medium are continuously introduced into the food product receiving chamber and food product preferably is also removed continuously from the chamber such that the process is a continuous or substantially continuous flow process.

Preferably, atmosphere is continuously or substantially continuously vented from the blancher. Where the blancher is vented, it is vented at a flow rate of at least about 5% of the flow rate of the heat transfer medium being introduced into the food product chamber. The blancher is preferably vented at a flow rate of no greater than about 30% of the flow rate of the heat transfer medium being introduced into the food product chamber.

In a preferred blancher embodiment, the blancher can also be versatile in that it can also have other modes of operation. For example, in a second mode of operation, solely liquid heat transfer medium is introduced into the food product receiving chamber to heat the food product. In a third mode of operation, a combination of gas or vapor heat transfer medium and a liquid heat transfer medium is introduced into the food product receiving chamber to heat the food product.

Objects, features, and advantages of the present invention include: a blancher that can operate using solely a gas or vapor heat transfer medium for heating food product more rapidly and efficiently than a blancher using only a liquid heat transfer medium or a combination of a liquid heat transfer medium and a vapor or gas heat transfer medium; a blancher that uses a rotary food product transport mechanism along with a gas or vapor heat transfer medium in a continuous flow blanching environment to more quickly and efficiently heat food product using a blancher that can be shorter in length; a blancher that can use a gas or vapor heat transfer medium to heat a diverse variety of food product; a blancher that can operate using solely steam as the heat transfer medium; a blancher of versatile construction that can heat; blanch or cook using a diverse variety of heat transfer media; a blancher that utilizes seals of durable, resilient and steam-tight construction for enabling solely steam to be used as the heat transfer medium; a blancher that can blanch more food product with a shorter residency time using a shorter blancher; and a blancher that is rugged, simple, flexible, reliable, and durable, and which is of economical manufacture and is easy to assemble, install, and use.

Other objects, features, and advantages of the present invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout and in which.

DETAILED DESCRIPTION OF THE PREFERRED EMBODIMENT

I. Introduction

Figure 1:
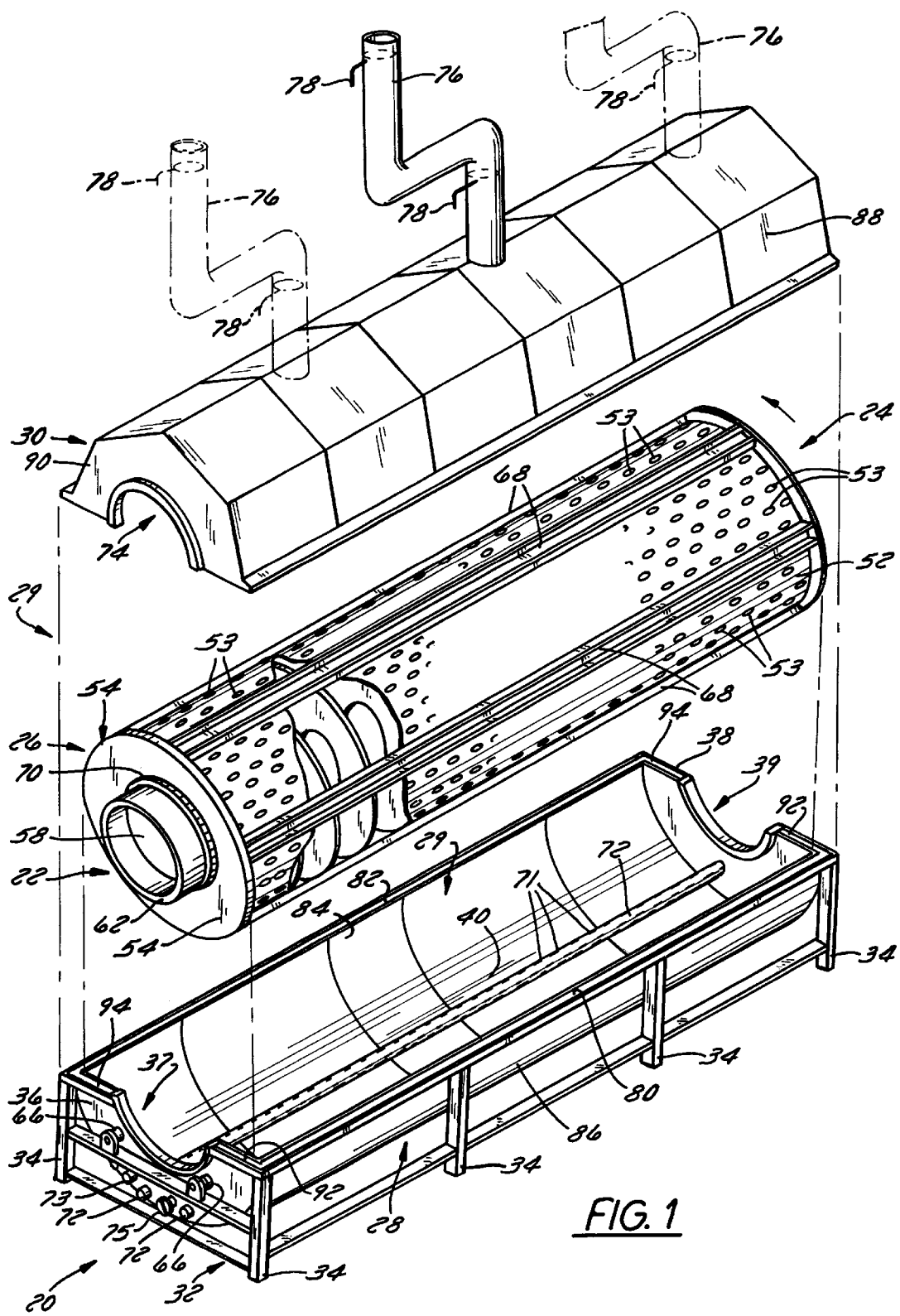
FIG. 1 is an exploded perspective view of a rotary blancher of this invention.
Figure 2:
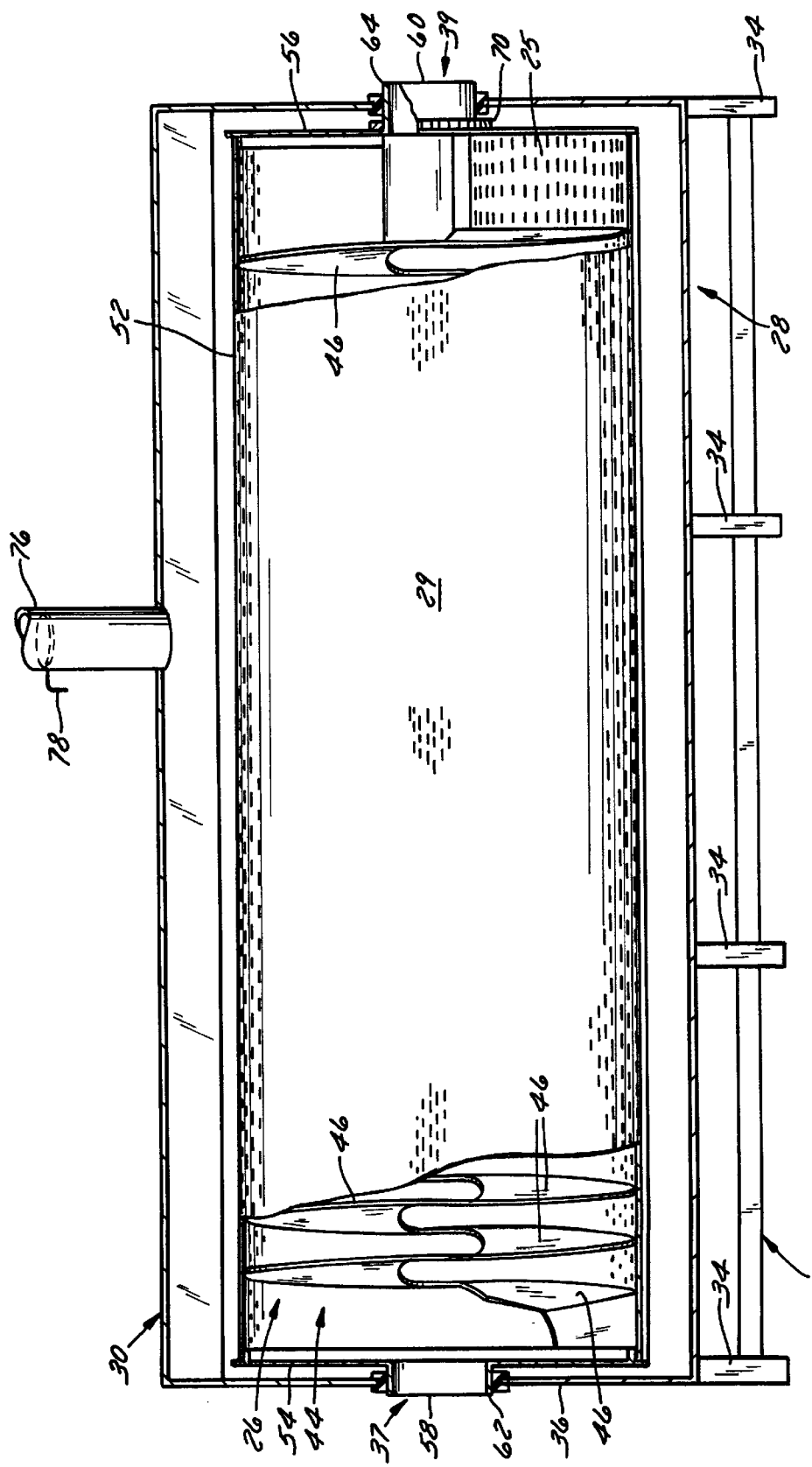
FIG. 2 is a side sectional view of the rotary blancher.
Figure 3:
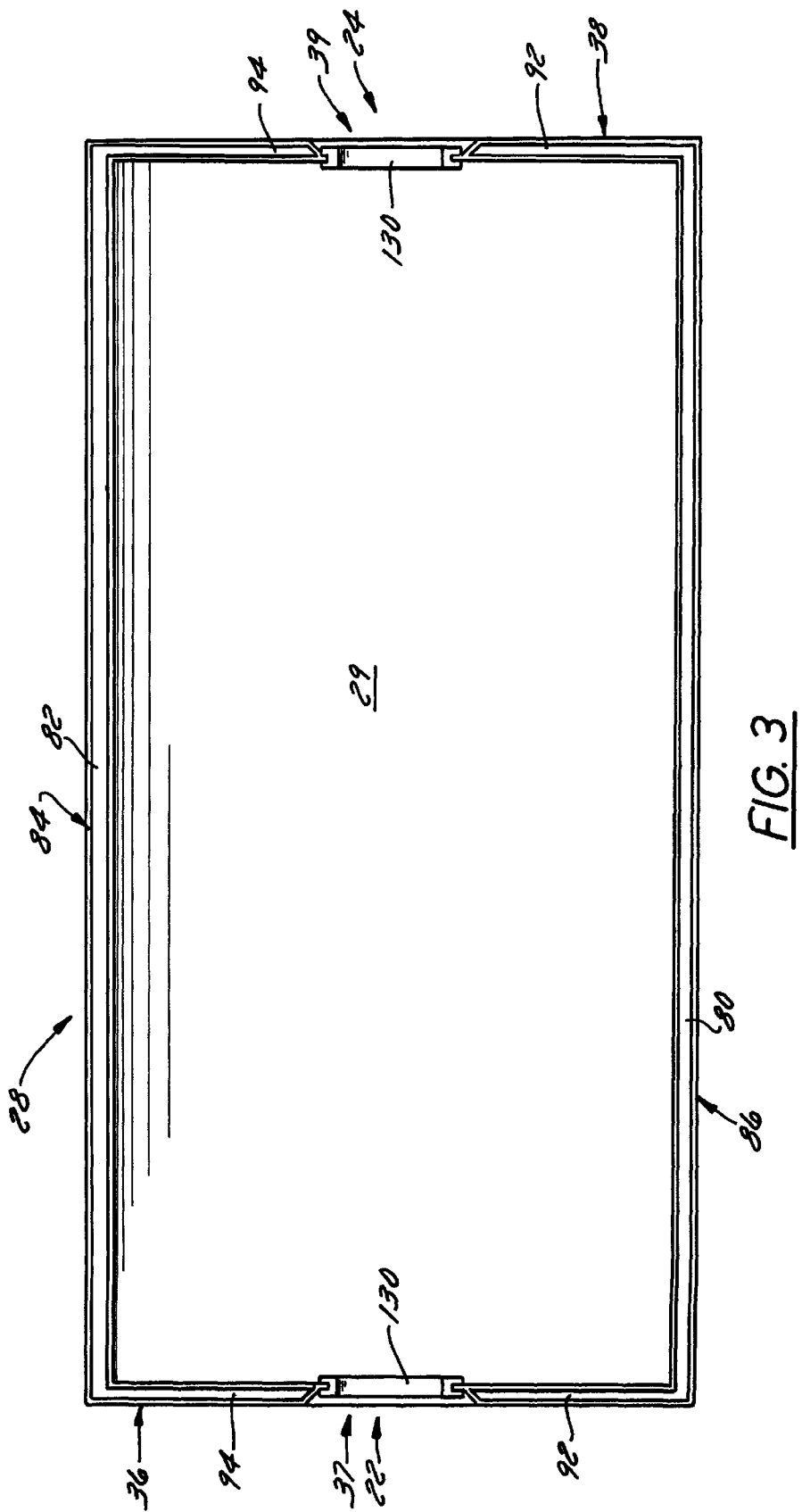
FIG. 3 is a top view of a tank of the rotary blancher.

FIGS. 1 and 2 illustrate a blancher 20 of this invention that is sealed except at a food product inlet 22 and a food product outlet 24 to permit its operation using a heat transfer medium that is solely a vapor, such as, preferably, solely steam. Where the blancher 20 has a food product transport mechanism 26 received in a tank 28 and covered by a lid 30, the tank 28 and lid 30 are sealed where they meet. Each seal referred to herein is of preferably steam-tight construction to retain the vaporous heat transfer medium within the blancher 20.

By its sealed construction, the blancher 20 of this invention is advantageously versatile because it can blanch or cook food product (1) using a solely liquid heat transfer medium, such as hot water, (2) a combination of a liquid and a gaseous or vaporous heat transfer medium, such as water and steam or water and water vapor, or (3) solely a vaporous heat transfer medium, such as steam, a heated gas that is not steam, or another heated vapor. This novel sealed blancher construction permits operation solely using steam resulting in significantly faster heating, blanching or cooking times. This novel blancher construction is also downwardly compatible in that it also permits operation using water or a combination of water and steam when needed.

II. Blancher

An exemplary rotary blancher 20 is shown in FIG. 1. The blancher 20 has an elongate open-top tank 28 which is supported by a frame 32 that has legs 34 which rest on the floor. The tank 28, preferably made of stainless steel or another suitable material appropriate for food processing applications, has an inlet endwall 36 and an outlet endwall 38. Endwalls 36 and 38 are joined to a curvilinear tank underside 40 which define the bottom and lengthwise sides of the tank 28. The tank underside 40 may be a single, continuous, curved plate running lengthwise between endwalls 36 and 38, or may be made of several long flat plates positioned side by side and angularly joined together to form the shape of a curve overall. Each endwall 36 and 38 has an arcuate or semicircular through-opening 37 and 39 respectively.

The food product transport mechanism 26 is received within the blancher 20 and is constructed and arranged to transport food product 42 (FIG. 7A) received in the blancher 20 toward the outlet 24. In its preferred embodiment, the food product transport mechanism 26 comprises an auger or helical screw 44 received within the blancher 20 and which rotates to urge food product 42 received in the blancher 20 toward the outlet 24.

The auger 44 has a plurality of axially spaced apart and interconnected flights 46 that spiral substantially the length of the interior of the tank 28. While the auger flights 46 can be carried on a support core 48 in the manner depicted in FIGS. 8 and 9, the auger 44 can be of coreless construction, such as is shown in FIGS. 1 and 2, meaning that its flights 46 are not supported by any core.

Preferably, the auger 44 is received in a drum 50 that is, in turn, also received in the blancher 20. The drum 50 has a sidewall 52, an inlet endwall 54, an outlet endwall 56, and an inlet and an outlet opening 58 and 60, through which food product 42 is introduced and discharged. Annular drum journals 62 and 64 extend beyond the drum inlet and outlet endwalls 54 and 56 and each provide a support surface upon which the weight of the drum 50 rests and can rotate during operation. Each of the drum journals 62 and 64 are rotatively supported by trunions 66 which are mounted to the frame 32 and which are positioned so that the weight of the drum 50 does not rest upon the tank inlet and outlet endwalls 36 and 38.

The drum 50 is constructed and arranged to receive food product 42 and a heat transfer medium such that the heat transfer medium can surround and contact the food product 42 within the drum 50 during blancher operation. Drum sidewall 52 has a plurality of perforations 53 and is preferably made of perforated panels, mesh, or a screenlike material in order to contain the food product 56 in the drum 50 while at the same time permitting the heat transfer medium to enter the interior of the drum through the perforations 53 to contact the food product 42.

Each of the perforations 53 in the drum sidewall 52 shown in FIG. 1 is exaggerated for clarity. Preferably, the perforations 53 are constructed and arranged to permit heat transfer medium to flow through the sidewall 52 into or out of the drum 50 while retaining the food product 42 in the drum 50. Particularly where the auger 44 is of coreless construction, the drum 50 preferably has circumferentially spaced apart elongate struts 68 that extend from one end wall 54 to the other end wall 56 to help strengthen and rigidify the drum 50 and auger 44. These struts 68 can also serve as mounts to which the panels that make up the perforate drum sidewall 52 are removably fastened.

During operation, the drum 50, and typically also the auger 44, is rotated to urge food product 42 through the blancher 20 while also causing the food product 42 to tumble thereby increasing heat transfer from the heat transfer medium to the food product 42. However, if desired, the auger 44 and drum 50 can be constructed such that the auger 44 rotates relative to or independently of the drum 50 to transport food product 42 through the blancher 20.

While use of a drum 50 is preferred, depending upon the construction of the tank 28, a drum 50 may not be needed. If desired, the auger 44 can simply rotate within the tank 28 to urge food product 42 from one end of the tank 28 to its opposite end.

The drum 50 and auger 44 are driven by a motor (not shown) which transfers power via a geartrain, belt, or chain (also not shown) to a drive sprocket 70 carried by either of the drum journals 62 or 64. The drum 50 preferably rotates at a speed selected to achieve the desired cooking time for the food product 42, thereby controlling its residency time within the blancher 20 and thus its time of exposure to the heat transfer medium.

When the food product 42 reaches the food product outlet 24, it is lifted and transferred to the outlet 24 through which it is typically deposited on a conveyor, in a container, or the like. A single radial lifting flight 25 or a plurality of circumferentially spaced apart radial lifting flights 25 can be used to transfer food product 42 from the blancher 20 to the outlet 24. Of course, other suitable arrangements can be used to transfer food product 42 from within the blancher 20 to the food product outlet 24.

One or more vapor or gas inlets 69 that preferably are manifolds 72 (only one is shown for purposes of illustration) are disposed within the tank 28 beneath the drum 50. Each manifold 72 is a cylindrical pipe having one or more rows of spaced discharge ports 71 or perforations disposed along its length through which a vaporous or gaseous heat transfer medium is introduced into the blancher 20. If desired, a mixture of compressed air and vaporous heat transfer medium may be discharged from the manifold 72 to better effect heat transfer.

Where steam is the heat transfer medium, steam is delivered to the manifolds 72 preferably under the control of one or more valves (not shown) which help regulate the flow rate and pressure of the steam. The steam may be automatically regulated, such as in the manner disclosed in U.S. Pat. No. 5,133,249 to Zittel, the disclosure of which is hereby incorporated herein by reference, or manually controlled to achieve the desired blanching or cooking conditions within the blancher 20. In a similar manner, compressed air may be communicated to the manifold 72 or another apparatus for communicating compressed air into the blancher 20. One such manner of introducing compressed air into a blancher is discussed more fully in the above noted U.S. Pat. No. 5,133,249. Fixtures can also be provided at one end of the tank 28 for the introduction of a temperature sensing device such as a thermometer or thermocouple (not shown) for monitoring the temperature of the heat transfer medium inside the blancher 20.

The blancher 20 preferably also has an inlet 73 permitting introduction of a liquid heat transfer medium into the tank 28 and an outlet 75 for discharging the liquid heat transfer medium. If desired, there can be a constant flow of liquid heat transfer medium into and out of the blancher 20. The discharge outlet 75 can also be used to assist cleaning the interior of the tank 28.

The lid 30 is of preferably elongate and vaulted construction so as to fit over and completely cover the tank 28 so as to provide an enclosure for the heat transfer medium. The lid 30 has upwardly extending semi-circular openings 74 positioned above the openings 37 and 39 in the tank endwalls 36 and 38 through which drum journals 62 and 64 extend. The lid 30 can be attached to the tank 28 in a manner such that it can be moved relative to the tank 28 to permit access to the interior of the blancher 20. The lid 30 can be attached to the tank 28 by one or more hinges such that it may be opened from either side of the blancher 20. If desired, the lid 30 can be attached to the tank 28 such that it can be lifted free of the tank 28 using cylinders or the like, such as in the manner disclosed in U.S. Pat. No. 4,788,476 to Zittel, the disclosure of which is hereby incorporated by reference.

Together, the tank 28 and lid 30 form a food product receiving chamber 29 into which food product 42 is received during operation. The food transport mechanism 26 urges food product 42 received in the chamber 29 from adjacent the food product inlet 22 toward the food product outlet 24.

To remove atmosphere from within the blancher 20, including vaporous heat transfer medium, there preferably is at least one vent pipe 76 attached to the lid 30 that communicates with the interior of the blancher 20. Preferably, there can be such a vent pipe 76 adjacent the inlet 22 and outlet 24, such as those shown in phantom in FIG. 1, for preventing vaporous heat transfer medium as well as moisture from escaping through the inlet 22 and outlet 24. Each vent pipe 76 preferably has at least one damper 78 and can have a pair of dampers 78 to help regulate flow.

III. Seal

The blancher 20 of this invention is constructed so as to be sealed about its periphery except at its food product inlet 22, where food product 42 enters the blancher 20, and at its food product outlet 24, where blanched or cooked food product 42 leaves the blancher 20. Where steam is the heat transfer medium, the seal provided is steam-tight. Where a non-liquid or vaporous heat transfer medium is used other than steam, the seal provided preferably is gas-tight.

Figure 5:
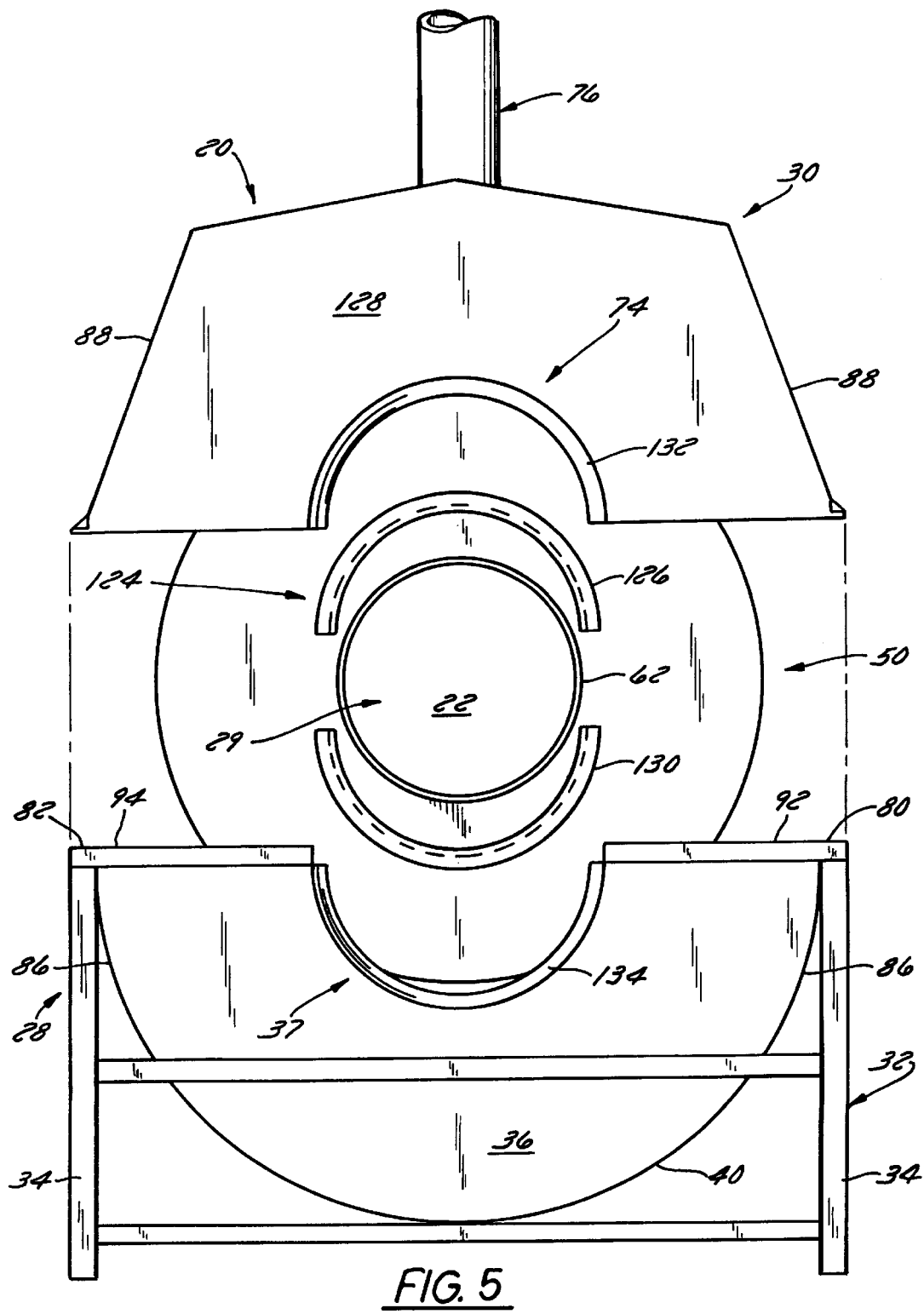
FIG. 5 is an exploded side view of the rotary blancher of this invention depicting a seal disposed around a drum journal at one end of the blancher.

Referring to FIGS. 1, 2 and 5, the blancher 20 is sealed between its tank 28 and lid 30 about the periphery where the tank 28 and lid 30 meet when the lid 30 is disposed in its closed position (FIG. 2). To further seal the blancher 20, the blancher 20 is sealed between the lid 30 and journals 62 and 64 and between the tank 28 and journals 62 and 64.

In its preferred embodiment, the tank 28 has a pair of spaced apart longitudinally extending seals 80 and 82 carried along the top edge of the tank sidewalls 84 and 86 for sealing with the longitudinally extending bottom edge of the lid sidewalls 88 and 90. At each end of the tank 28 are a pair of seals 92 and 94 with one seal 92 disposed on one side of the journal cut-out 37 and 39 and the other seal 94 disposed on the other side of the journal cut-out 37 and 39.

FIGS. 4A–4F illustrate some exemplary and preferred embodiments of seals 80, 82, 92 and 94. For purposes of convenience when discussing FIGS. 4A–4F, the seals shall be referred to by reference numerals 80a–80f.

Figure 4A:
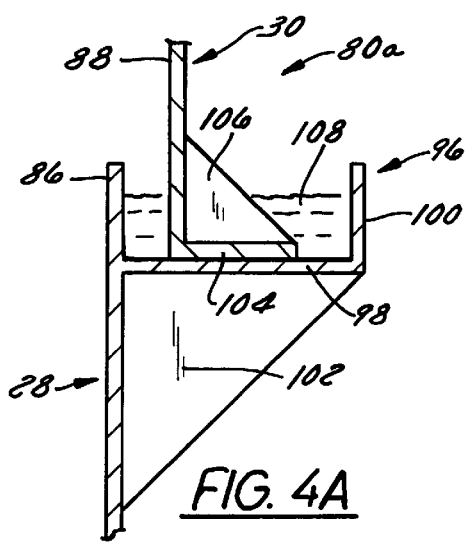
FIGS. 4A–4F depict some suitable, exemplary seals disposed between the tank and a cover of the rotary blancher.

FIG. 4A depicts the seal 80a as comprising a channel 96 carried by a sidewall 86 of the tank 28 that receives the bottom edge of the lid 30. The channel 96 has a bottom wall 98 cantilevered outwardly from the tank sidewall 86 to which an outer lip 100 is secured. The tank sidewall 86 is the inner wall of the channel 96. To help support the weight of the lid 30 received in the channel, the joint between the bottom wall 98 and the tank 28 can be reinforced by longitudinally spaced apart angle irons 102, each of which extends from the bottom wall 98 to the tank sidewall 86.

When the lid 30 is in its closed position, the bottom edge of the lid sidewall 88 is received in the channel 96. In its preferred embodiment, the bottom sidewall edge has a generally perpendicularly outwardly extending leg 104. Longitudinally spaced apart angle irons 106 that extend from the leg 104 to the sidewall 88 help reinforce the attachment between the leg 104 and sidewall 88.

The channel 96 is constructed so as to receive moisture or a liquid 108 that preferably is water or the like that contacts the lid leg 104 creating a seal that preferably is gas-tight and which is steam-tight. While a sufficient amount of moisture preferably condenses within the channel 96 during blancher operation to form the seal 80a, water or another liquid can be pumped into the channel 96 to create the seal 80a if desired. While the layer of liquid 108 extends well above the lid leg 104, the layer of liquid 108 need only be a thin film between the interior of the channel bottom wall 98 and underside of the leg 104.

Figure 4B:
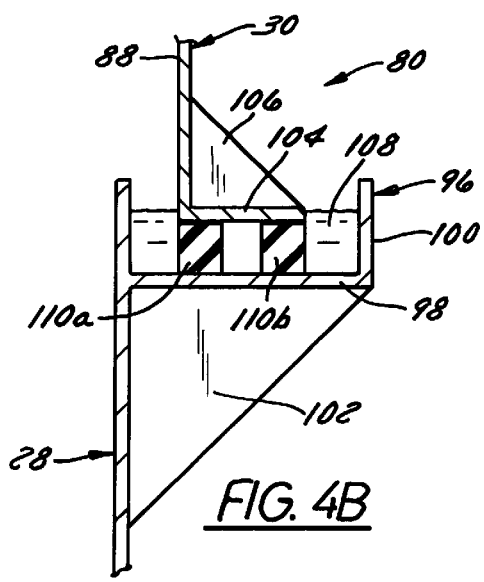

FIG. 4B depicts a seal 80b similar to that shown in FIG. 4A, but further includes a seal 110 disposed between the bottom of the lid leg 104 and the channel bottom wall 98. Seal 110 preferably is made of rubber, plastic, or a flexible, synthetic material that can be an elastomer, a polymer, or the like. Seal 110 preferably is constructed of a food grade material or a material safe for use in food processing applications. For example, the seal 110 can be constructed of an open or closed cell foam, neoprene, polyethylene, ultra high molecular weight polyethylene, silicone rubber, urethane, polyester, nylon, silicone, fluoroelastomer, VITON, TEFLON, or another suitable material. If desired, the seal 110 can comprise weatherstripping.

The seal 110 provides a steam-tight and preferably a gas-tight seal between the tank 28 and lid 30 even when no liquid 108 is present in the channel 96. Thus, seal 110 is intended to provide a suitable seal between the lid 30 and tank 28 whether or not there is liquid 108 in the channel 96 and whether or not there is a channel present. In the seal embodiment shown in FIG. 4B, seal 110 comprises a pair of spaced apart sealing strips 110a and 110b for providing two complementary seals that preferably seal independently of liquid 108 in the channel 96 and which do not necessarily require the liquid 108 to form a seal.

Figure 4C:
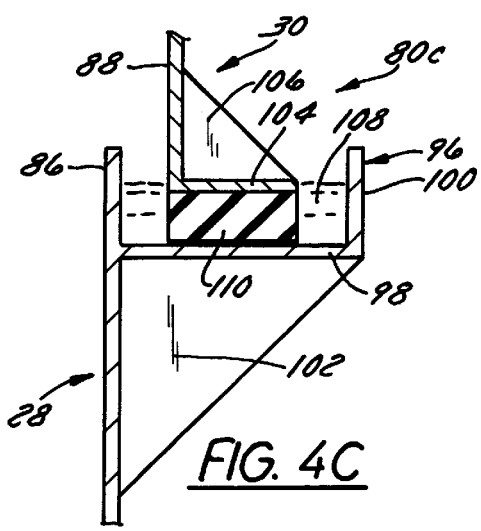

FIG. 4C shows a seal 80c similar to the seal 80b depicted in FIG. 4B except that seal 110 is of one-piece construction.

Figure 4D:
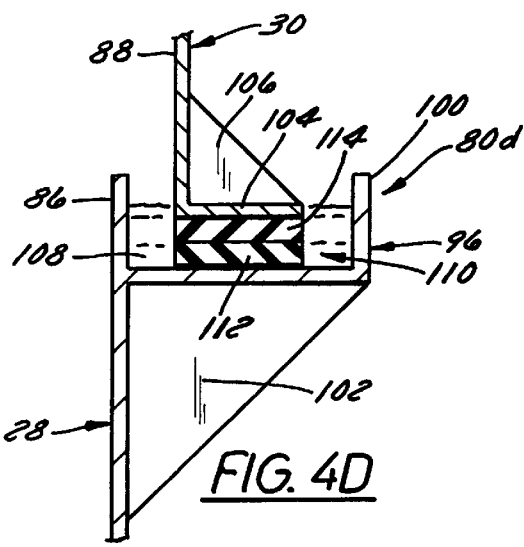

FIG. 4D shows a seal 80d similar to seal 80c except that seal 110 is of two-piece construction having one seal strip 112 attached to the channel bottom wall 98 and another seal strip 114 attached to the lid leg 104.

Figure 4E:
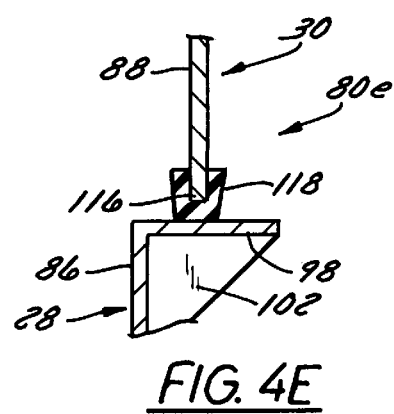
Figure 4F:
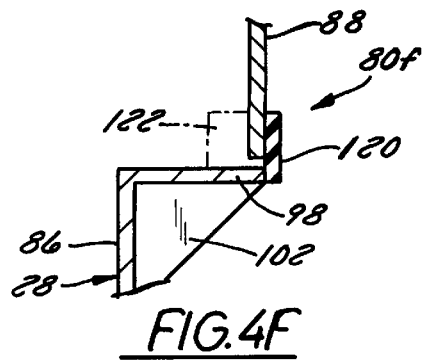

FIGS. 4E and 4F depict seal embodiments which do not rely on a liquid to provide the seal between the tank 28 and lid 30. FIG. 4E depicts the sidewall 88 of the lid 30 terminating at an edge 116 and the sidewall 86 of the tank 28 having a right-angled leg 98 supported by an angle iron 102. A generally U-shaped sealing strip 118 is received over the lid sidewall edge 116 and which rests upon leg 98 when the lid 30 is in its closed position providing a seal 80e between the lid 30 and tank 28 that preferably is steam-tight.

FIG. 4F depicts a sealing skirt 120 attached to the lid sidewall 88 which extends downwardly and contacts leg 98 to provide a seal 80f therebetween. If desired, a second skirt 122 (shown in phantom) can be attached to the opposite side of the sidewall 88 and extend downwardly into contact with tank 28.

Referring to FIG. 5, to seal at each end of the drum 50 of the blancher 20 while the drum 50 is rotating, there is a seal 124 between each drum journal 62 and 64 and the tank 28 and lid 30. In its most preferred embodiment, the seal 124 comprises an upper sealing strip 126 attached to the lid end wall 128 that bears against the journal and a lower sealing strip 130 attached to the tank end wall 36 that also bears against the journal. Preferably, the upper sealing strip 126 is mounted to an arcuate tapered region 132 of the lid end wall 128 that bounds the drum opening 74 in the lid 30. Preferably, the lower sealing strip 128 is mounted to an arcuate tapered region 134 of the tank end wall 36 that bounds the drum opening in the tank 28.

Figure 6D:
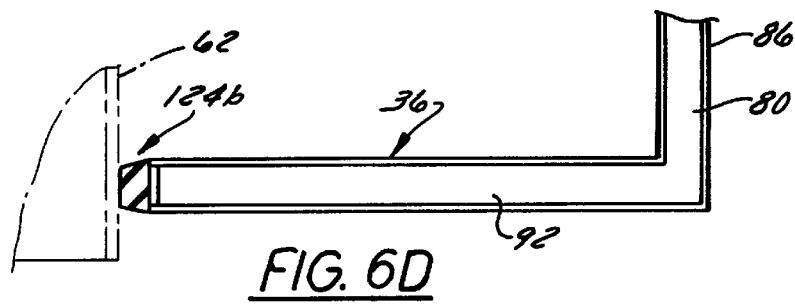
FIGS. 6A–6E depict some suitable, exemplary seals disposed between the drum journal and cover or tank.
Figure 6C:
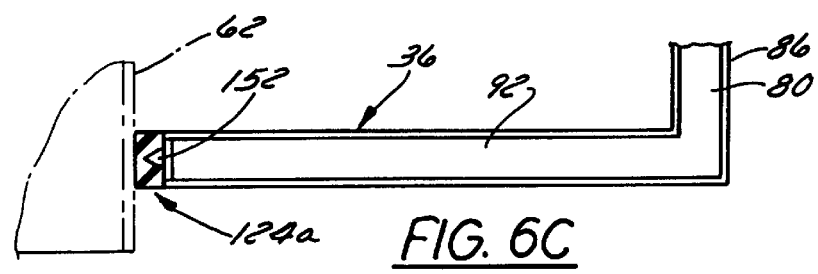
Figure 6A:
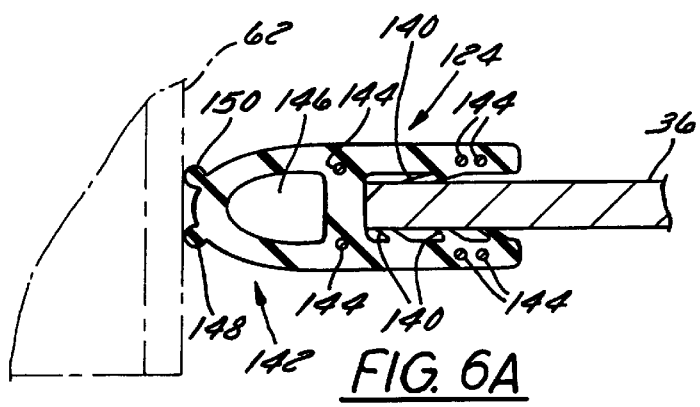
Figure 6B:
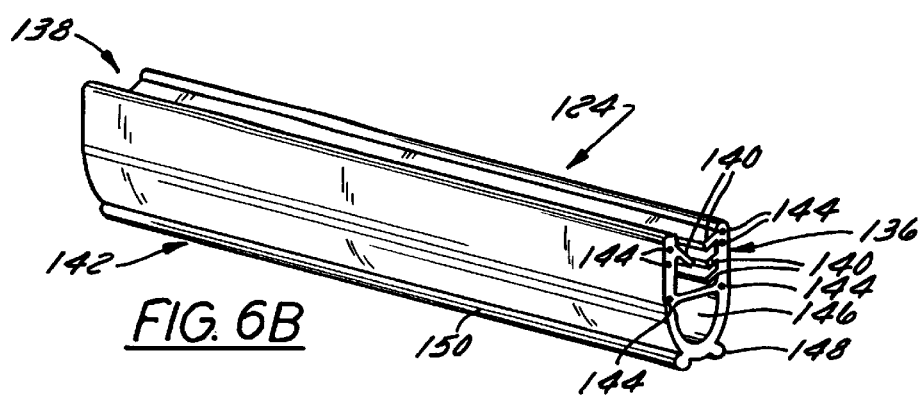

FIGS. 6A–6F illustrate a number of various exemplary suitable drum journal seals 124. FIGS. 6A and 6B illustrate a preferred embodiment of the seal 124 having a generally U-shaped elongate strip-like body 136 with a notch 138 along one side for receiving one edge of either the tank endwall 36 or the lid endwall 128 (FIG. 5). Received within the notch 138 are a plurality of inwardly extending and canted fingers 140 to create a tight friction fit between the seal 124 and the endwall 36 or 128 for resisting removal from the endwall. The other side of the seal body 136 preferably is continuous and rounded and forms a sealing surface 142 that bears against the journal 62.

While the seal 124 is carried by both endwall 36 and 128, for purposes of convenience, seal 124 will be discussed further herein in combination with endwall 36. To help form the seal 124 and provide durability, the seal 124 can be reinforced with a plurality of wires 144. To give the seal compressibility for enabling the seal to compress slightly against the journal 62, the seal 124 has a hollow 146 adjacent the sealing surface 142. The sealing surface 142 preferably also has a pair of spaced apart elongate lobes 148 and 150 that each extend substantially the length of the seal 124 and which each seal against the journal 62. The lobes 148 and 150 preferably provide redundant or complementary seals between the endwall 36 and drum 62.

The seal 124 preferably is constructed of a resilient and durable material capable of providing a steam-tight and preferably a gas-tight seal against the rotating drum 62. The seal 124 can be comprised of a rubber, plastic, elastomeric or another suitable seal material. To help the seal 124 resist wear due to the drum 62 rotating, the seal 124 can be made of a self-lubricating material, impregnated with a lubricant, or made of a material possessing a great deal of resistance to friction. Some exemplary and preferred seal materials include nylon, TEFLON, polyester, neoprene, fluoroelastomer, urethane, polyethylene, ultra-high molecular weight polyethylene, silicone, silicone rubber, VITON, or another suitable seal material. Preferably, the seal 124 is made of food grade material or a material suitable for use in food processing applications.

A lubricant can also be externally applied. Examples of suitable lubricants preferably include silicone, TEFLON or white lithium grease. Preferably, the lubricant is a food grade material that is safe for use in food processing applications.

FIG. 6C depicts a seal 124a carried by the tank endwall 36 that is of resilient and flexible construction and which has a recess 152 for facilitating compression and flexure of the seal 124a in response to drum wobble, eccentricity, misalignment, or mislocation. FIG. 6D depicts another seal 124b that can be carried either by the drum 62 or by the endwall 36.

Figure 6F:
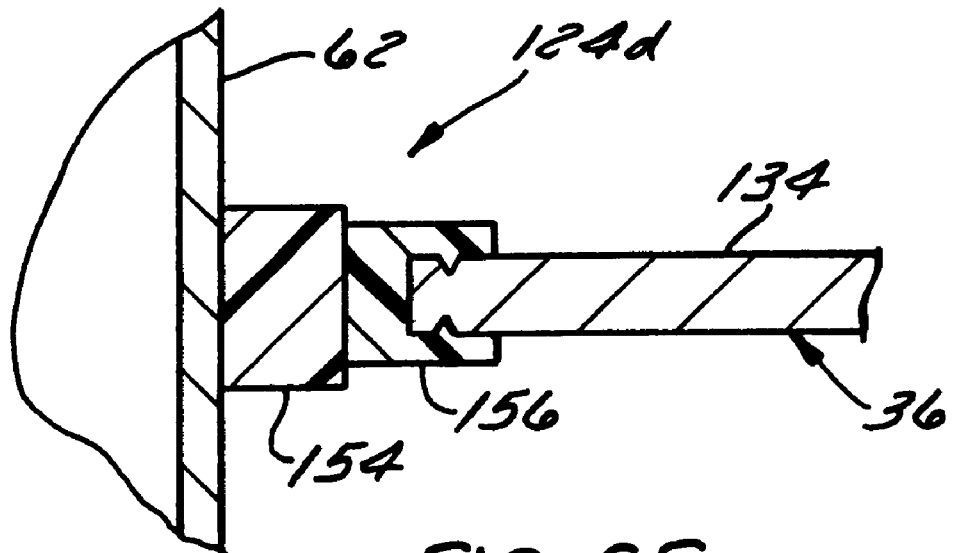
Figure 6E:
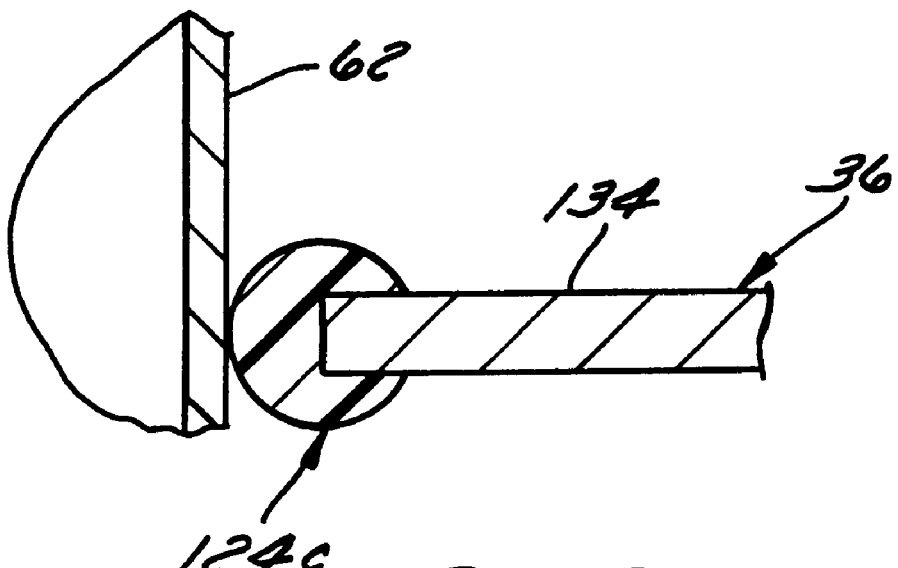

FIG. 6E illustrates a seal 124c of generally round cross-section. The seal 124c has a notch for receiving the tapered region 134 of the endwall 36. FIG. 6F depicts a seal 124d comprising a seal 154 carried by the drum 62 and another seal 156 carried by the endwall 36.

IV. Blancher Operation Modes

A. Gas or Vapor Operation

Figure 7A:
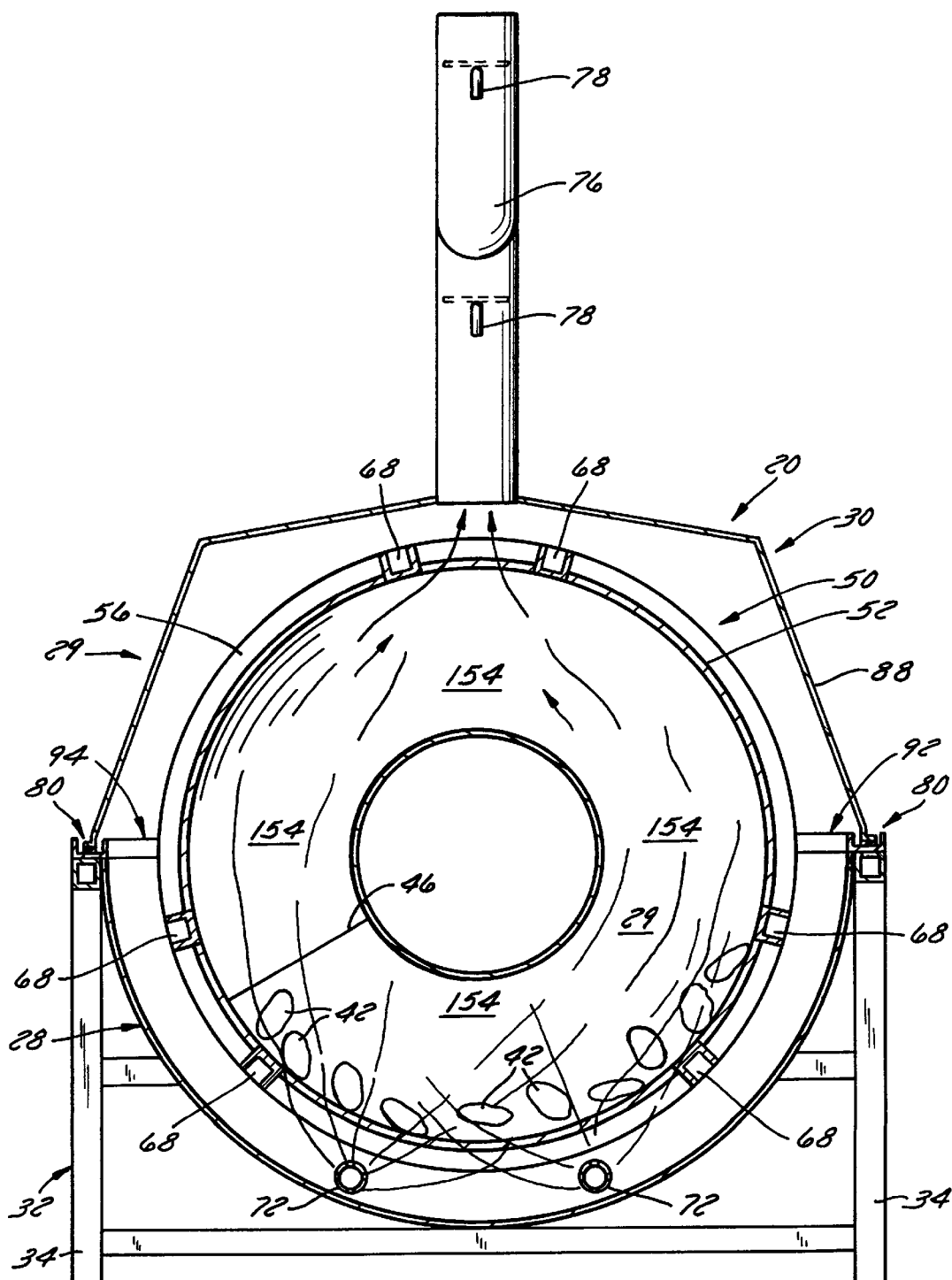
FIG. 7A is a side sectional view of the rotary blancher of this invention depicting operation using only a vapor or a gas as the heat transfer medium.

FIG. 7A illustrates operation of the sealed blancher 20 of this invention using only a heated gas or preferably a heated vapor as the heat transfer medium 154 to blanch or cook the food product 42 within the blancher drum 50. Preferably, the gas or vapor heat transfer medium 154 is heated to a temperature above about 200° Fahrenheit. Where the heat transfer medium 154 is a vapor, the temperature of the vapor preferably is its vaporization temperature or within about 5° Fahrenheit of its vaporization temperature. For example, where the heat transfer medium 154 is water vapor or steam, the temperature of the steam is at least about 212° Fahrenheit and can be lower than 200° Fahrenheit. Of course, the vaporization temperature for the vaporous heat transfer medium 154 will vary depending upon factors, such as the altitude or distance above sea level.

Figure 8:
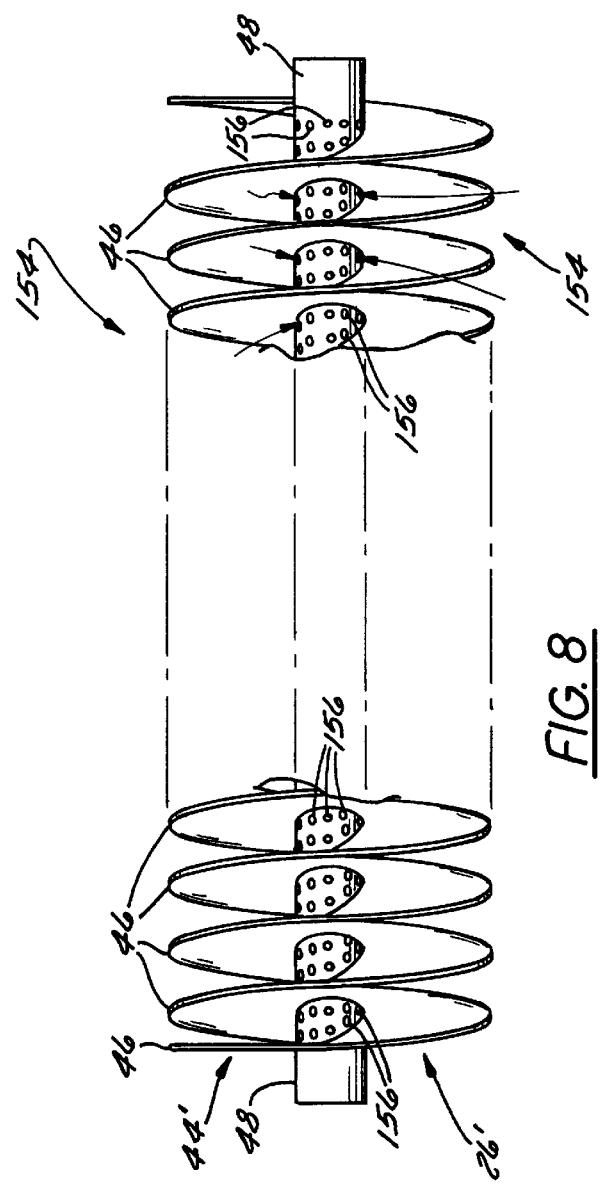
FIG. 8 is a perspective view of an auger core that is perforated for distributing steam within the rotary blancher.
Figure 9:
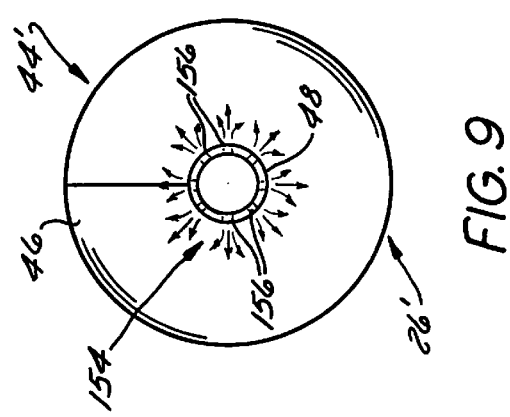
FIG. 9 is a sectional view of the perforated auger core.

As is shown in FIG. 7A, the gaseous or vaporous heat transfer medium 154 is introduced into the blancher 20 so as to pass through the perforated drum 50 so as to immerse the food product 42 traveling through the drum 50 in the heat transfer medium 154. In the preferred embodiment of the blancher 20 shown in FIG. 7A, the gaseous or vaporous heat transfer medium 154 is introduced into the interior of the blancher 20 through the manifolds 72.

Where the blancher auger 44' is supported by a core 48, the core 48 can be of perforated construction, such as is shown in FIGS. 8 and 9, for introducing the gaseous or vaporous heat transfer medium 154 through a plurality of perforations 156 directly into the drum 50. Preferably, the perforations 156 extend radially about the circumference of the core 48 and are distributed along substantially the length of the core 48 for ensuring food product 42 is uniformly contacted by gaseous or vaporous heat transfer medium 154 as the food product 42 travels the length of the drum 50.

Where the blancher 20 has a perforated core 48, no manifolds 72 are required. However, where the blancher 20 has a perforated core 48, the gaseous or vaporous heat transfer medium 154 can be substantially simultaneously introduced through both the core 48 and one or more manifolds 72. Where a manifold 72 is used, a solid core can be used or the blancher 20 can be of coreless construction.

To communicate gaseous or vaporous heat transfer medium 154 to the core 48 a heat transfer conduit (not shown), that can be flexible or stainless steel piping, preferably extends from the exterior of the blancher 20 through either the food product inlet 22 or the outlet 24 to the core 48. Other methods and apparatus can also be used to communicate the gaseous or vaporous heat transfer medium 154 from outside the blancher 20 to the perforated core 48.

Preferably, gaseous or vaporous heat transfer medium 154 is introduced into the blancher 20 substantially throughout the length of the drum 50. During operation, steam is vented from within the blancher 20 to exterior the blancher 20. During operation, steam flows in the manner generally indicated in PIG. 7A through the drum perforations 53 into the interior of the drum 50 and steam flows through the drum perforations out of the drum to the vent 76 where it is drawn from the blancher 20.

Where heat transfer medium 154 is vented from the blancher 20, between about 5% and about 30% of the heat transfer medium flow rate input into the blancher 20 preferably is vented. For example, where steam is the heat transfer medium 154, steam at a flow rate of between about 1000 and about 3000 pounds per hour is preferably introduced into the blancher 20, and atmosphere from within the blancher 20 is preferably vented out of the blancher 20 at a rate of between about 1000 and about 3000 cubic feet per minute. By venting some atmosphere from the blancher 20, not only is the flow of heat transfer medium 154 out of the food product inlet 22 and outlet 24 minimized and preferably substantially prevented, but the flow of heat transfer medium 154 across the food product 42 is preferably further encouraged.

B. Liquid Operation

Figure 7B:
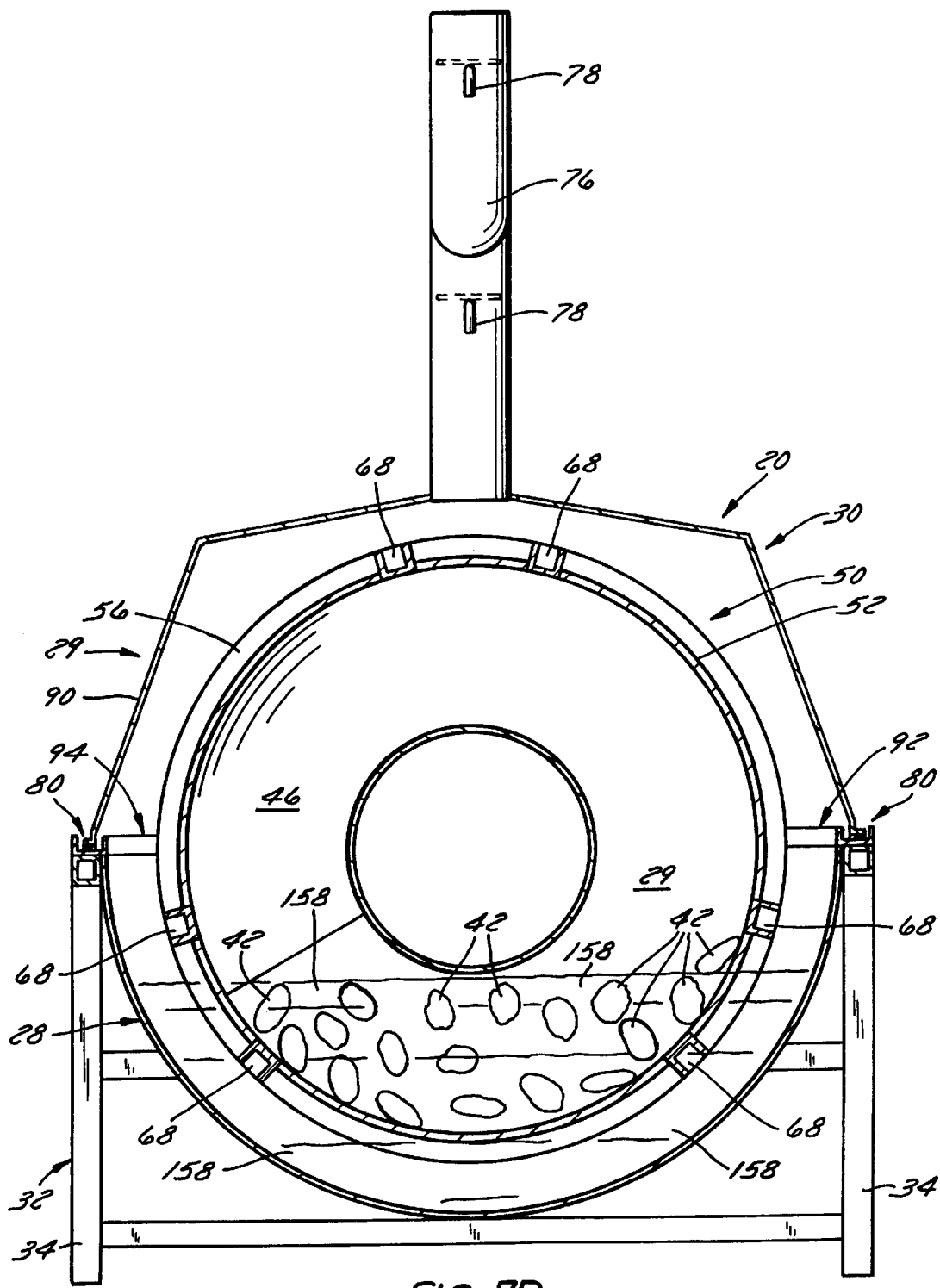
FIG. 7B is a side sectional view of the rotary blancher of this invention depicting operation using only a liquid as the heat transfer medium.

FIG. 7B illustrates operation of the sealed blancher 20 of this invention using only a liquid, such as water, as a heat transfer medium 158 to blanch or cook the food product 42 within the blancher drum 50. During operation, food product 42 is introduced into the drum 50 through the food product inlet 22 into a heated liquid bath 158 that typically varies from about an inch deep to as much as 21 inches deep and extends generally at about the same depth substantially the length of the drum 50.

Preferably, the liquid heat transfer medium 158 disposed in the tank 28 is heated to a temperature of at least about 120° Fahrenheit and no greater than about the vaporization temperature of the liquid heat transfer medium 158. Where the liquid heat transfer medium 158 is water, the water heat transfer medium is heated to a temperature of at least about 160° Fahrenheit and no greater than about 212° Fahrenheit or its vaporization temperature. To enhance heat transfer, the liquid heat transfer medium 158 can flow through at least a portion of the tank 28 and/or the drum 50. If desired, the liquid heat transfer medium can be introduced into the drum 50 at a flow rate that causes at least some turbulence in the heat transfer medium bath 158.

Turbulence promoters can also be used to help increase the rate of heat transfer between the liquid heat transfer medium 158 and the food product 42 in the drum 50. For example, a gas, such as air or the like, can be introduced in the tank 28 in the liquid heat transfer medium 158 to increase heat transfer. The gas can be compressed and introduced under pressure into the liquid heat transfer medium 158.

During operation, the interior of the blancher 20 preferably is vented through the vent pipe 76 to minimize escape through the food product inlet 22 and outlet 24 of a small amount of liquid heat transfer medium 158 that turns to vapor during operation, typically through evaporation or the like. However, where the liquid heat transfer medium 158 does not evaporate or is not heated to a temperature where an appreciable amount evaporates, venting may not be needed.

C. Hybrid Operation

Figure 7C:
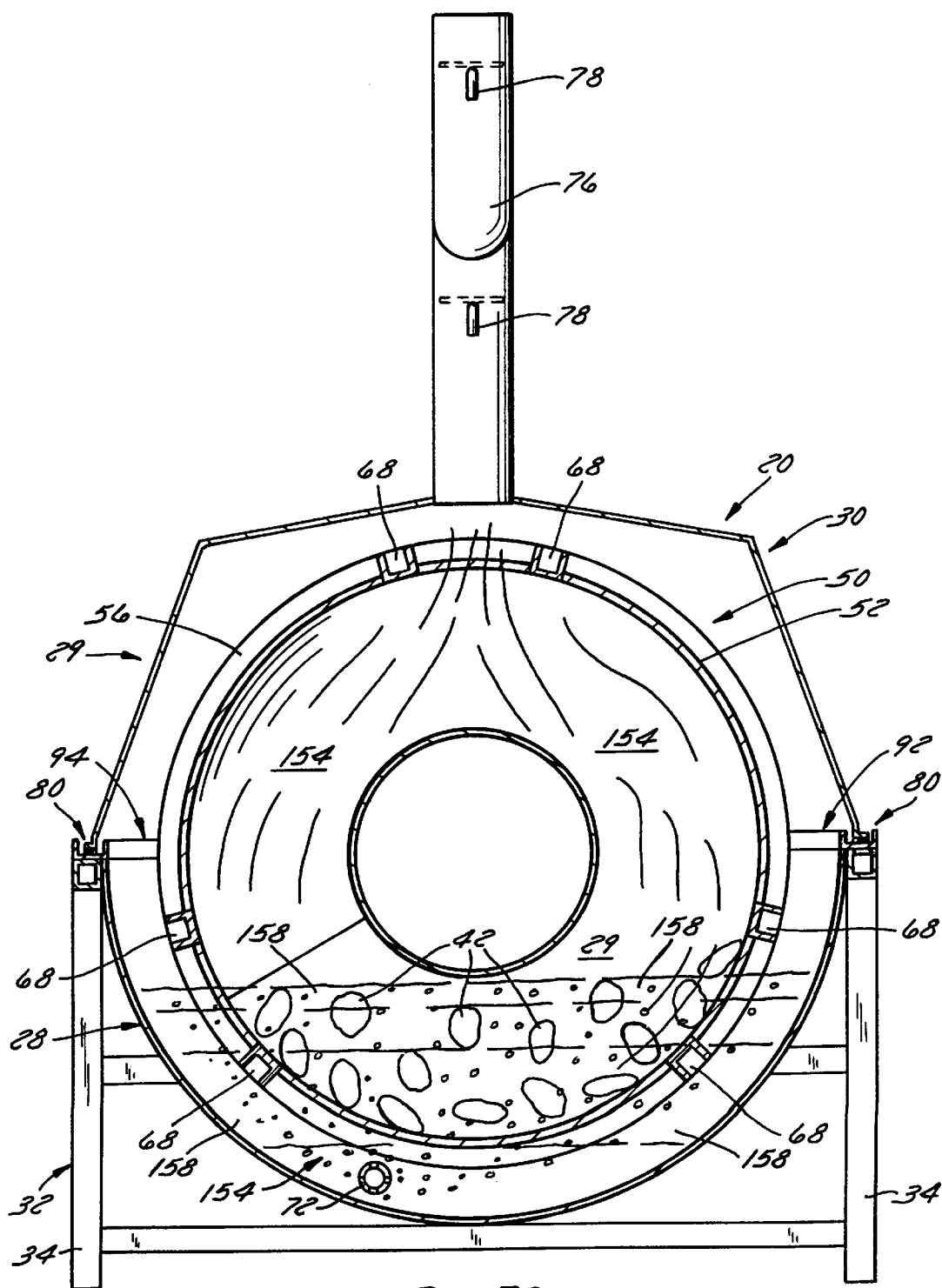
FIG. 7C is a side sectional view of the rotary blancher of this invention depicting operation using a combination of water and steam as the heat transfer medium.

Referring to FIG. 7C, the blancher 20 of this invention is also capable of hybrid operation where the heat transfer medium is a combination of a heated gas or vapor heat transfer medium 154 and a liquid heat transfer medium 158. For example, in one preferred hybrid combination, the hybrid heat transfer medium comprises water 158 and steam 154. Other combinations can be used. Preferably, the liquid heat transfer medium 158 has the same or substantially the same characteristics as described above. Preferably, the gas or vapor heat transfer medium 154 has the same or substantially the same characteristics as also described above.

The gas or vapor heat transfer medium 154 can be introduced through one or more manifolds 72 in the blancher 20. The gas or vapor heat transfer medium 154 can also be introduced through a core 48 of perforated construction.

During operation, some atmosphere is vented from the blancher 20 to prevent excessive flow of the gas or vapor heat transfer medium 154 or liquid vapor out the food product inlet 22 and outlet 24. Preferably, during hybrid operation, an amount or flow rate that is between about 1% and about 2% of the gas or vapor heat transfer medium flow rate input into the blancher 20 preferably is vented from the blancher.

V. Use and Operation

In use, the blancher 20 of this invention is used to heat food product 42 preferably to blanch or cook the food product. Food product 42 that can be heated using the blancher 20 includes food product 42 in pouches that are preferably constructed of a flexible, synthetic material that typically is of laminate construction. Examples of pouched food product include: sauces, soups, juices, catsup, fruits, certain pastas, vegetables, meats and the like. Food product 42 that can be heated using the blancher 20 includes food product 42 not in pouches. For example, and without limitation, pastas and vegetables like potatoes are but two types of food product 42 not in pouches that can be heated, cooked or blanched by the blancher 20 of this invention.

In operation, food product 42 is introduced into the blancher 20 through the food product inlet 22 and preferably enters the drum 50. The food product transport mechanism 26 preferably rotates to urge the food product 42 from adjacent the food product inlet 22 toward the food product outlet 24. Where the food product transport mechanism 26 rotates during operation, such as is depicted by the rotatable auger 44 in FIG. 1, both the drum 50 and the food product transport mechanism 26 preferably rotate substantially in unison.

The rate of rotation of the auger 44 is controlled to manipulate the residency time of the food product 42 within the blancher 20. For example, the auger 44 can rotate as slow as 0.5 revolutions per minute to as fast as 10 revolutions per minute depending on factors such as 1) the type of food product 42, 2) the length of the blancher, 3) the diameter of the blancher, 4) whether the food product 42 is simply being heated, preheated, blanched or cooked, 5) the type of heat transfer medium being used, and 6) other factors. Typically, selection of a rate of rotation is based upon experience and routine testing and experimentation.

As the food product 42 travels along the blancher 20, it is exposed to at least one type of heat transfer medium whether it be a liquid heat transfer medium 158, a vaporous heat transfer medium 154, a gaseous heat transfer medium 154, or a combination thereof. Contact with the heat transfer medium transfers heat to the food product 42 which heats, cooks and/or blanches the food product 42. During operation, some atmosphere is vented from within the blancher 20 to minimize and preferably substantially prevent loss of heat transfer medium through the food product inlet 22 and the food product outlet 24.

Thus, a continuous or substantially continuous flow of food product 42 can be heated, blanched or cooked using the blancher 20 of this invention and a heat transfer medium 154 that is solely a gas or a vapor, such as preferably steam.

It is also to be understood that, although the foregoing description and drawings describe and illustrate in detail one or more embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A blancher for heating food product solely using a non-liquid heat transfer medium comprising:
  a) a food product receiving chamber that is sealed and which has a food product inlet and a food product outlet in communication with atmosphere exterior of the chamber;
  b) a food product transport mechanism received in the chamber for urging food product in the chamber toward the food product outlet; and
  c) means for introducing the non-liquid heat transfer medium into the chamber that heats the food product received in the chamber,
  d) a steam vent from an upper portion of said chamber for venting atmosphere from the blancher.

2. The blancher of claim 1 wherein the food product transport mechanism comprises a rotary food product transport mechanism.

3. The blancher of claim 1 wherein the food product receiving chamber comprises:
  1) an elongate and horizontally disposed tank having a pair of spaced apart sidewalls each terminating in a longitudinally extending edge and a pair of spaced apart endwalls each terminating in a transversely extending edge;
  2) an elongate and horizontally disposed lid overlying the tank and having a pair of spaced apart sidewalls each terminating in a longitudinally extending edge and a pair of spaced apart endwalls each terminating in a transversely extending edge;
  3) wherein the lid has an open position permitting access to the interior of the food product receiving chamber;
  4) wherein the lid has a closed position overlying the tank with i) the edges of the sidewalls of the lid overlying the edges of the sidewalls of the tank and ii) the edges of the endwalls of the lid overlying the edges of the endwalls of the tank;
  5) a seal disposed between the edges of the sidewalls of the lid and the edges of the sidewalls of the tank when the lid is disposed in the closed position;

6) a seal disposed between the edges of the endwalls of the lid and the edges of the endwalls of the tank when the lid is disposed in the closed position.

4. The blancher of claim 1 wherein the food product receiving chamber comprises:
 1) an elongate and horizontally disposed tank having a pair of spaced apart sidewalls each terminating in a longitudinally extending edge and a pair of spaced apart endwalls each terminating in a transversely extending edge;
 2) an elongate and horizontally disposed lid overlying the tank and having a pair of spaced apart sidewalls each terminating in a longitudinally extending edge and a pair of spaced apart endwalls each terminating in a transversely extending edge;
 3) wherein the lid has an open position permitting access to the interior of the food product receiving chamber;
 4) wherein the lid has a closed position overlying the tank with i) the edges of the sidewalls of the lid overlying the edges of the sidewalls of the tank and ii) the edges of the endwalls of the lid overlying the edges of the endwalls of the tank;
 5) a seal disposed between the edges of the sidewalls of the lid and the edges of the sidewalls of the tank when the lid is disposed in the closed position;
 6) a seal disposed between the edges of the endwalls of the lid and the edges of the endwalls of the tank when the lid is disposed in the closed position; and
 7) wherein the food product outlet is disposed in one of the endwalls of the tank and the lid and the food product inlet is disposed in the other of the endwalls of the tank and the lid.

5. The blancher of claim 1 wherein the food product receiving chamber comprises:
 1) an elongate and horizontally disposed tank having a pair of spaced apart sidewalls each terminating in a longitudinally extending edge and a pair of spaced apart endwalls each terminating in a transversely extending edge;
 2) an elongate and horizontally disposed lid overlying the tank and having a pair of spaced apart sidewalls each terminating in a longitudinally extending edge and a pair of spaced apart endwalls each terminating in a transversely extending edge;
 3) wherein the lid has an open position permitting access to the interior of the food product receiving chamber;
 4) wherein the lid has a closed position overlying the tank with i) the edges of the sidewalls of the lid overlying the edges of the sidewalls of the tank and ii) the edges of the endwalls of the lid overlying the edges of the endwalls of the tank;
 5) a seal disposed between the edges of the sidewalls of the lid and the edges of the sidewalls of the tank when the lid is disposed in the closed position;
 6) a seal disposed between the edges of the endwalls of the lid and the edges of the endwalls of the tank when the lid is disposed in the closed position;
 7) wherein the food product outlet is disposed in one of the endwalls of the tank and the lid and the food product inlet is disposed in the other of the endwalls of the tank and the lid; and
 8) wherein the rotary food transport mechanism comprises a helical auger received in the food product receiving chamber.

6. The blancher of claim 1 further comprising a drum disposed inside the food product receiving chamber wherein the food transport mechanism is received in the drum.

7. The blancher of claim 6 further comprising
 1) a first journal extending outwardly from the drum that is in communication with the food product inlet;
 2) a second journal extending outwardly from the drum that is in communication with the food product inlet;
 3) a seal disposed between the first journal and the food product receiving chamber; and
 4) a seal disposed between the second journal and the food product receiving chamber.

8. The blancher of claim 7 wherein each of the journals extends exteriorly of the food product receiving journal.

9. The blancher of claim 8 wherein the drum and each of the journals rotate.

10. The blancher of claim 1 wherein said vent is in a gas flow communication with the uppermost portion of the interior of the food product receiving chamber for venting atmosphere from within the food product receiving chamber exteriorly of the food product receiving chamber.

11. The blancher of claim 1 wherein the food product receiving chamber comprises:
 1) an elongate and horizontally disposed tank having i) a pair of spaced apart sidewalls each terminating in a longitudinally extending edge and ii) a pair of spaced apart endwalls each terminating in a transversely extending edge;
 2) an elongate and horizontally disposed lid having a pair of spaced apart sidewalls each terminating in a longitudinally extending edge and a pair of spaced apart endwalls each terminating in a transversely extending edge;
 3) wherein the lid overlies the tank with i) the edges of the sidewalls of the lid overlying the edges of the sidewalls of the tank and ii) the edges of the endwalls of the lid overlying the edges of the endwalls of the tank;
 4) a first food product receiving chamber seal disposed between the edges of the sidewalls of the lid and the edges of the sidewalls of the tank when the lid is disposed in the closed position;
 5) a second food product receiving chamber seal disposed between the edges of the endwalls of the lid and the edges of the endwalls of the tank when the lid is disposed in the closed position;
 6) a rotatable drum received between the lid and the tank within the food product receiving chamber having a plurality of spaced apart and outwardly extending journals with one of the journals in communication with the food product inlet and the other of the journals in communication with the food product outlet; and
 7) a first journal seal in operable communication with one of the journals and with one of the tanks and the lid; and
 8) a second journal seal in operable communication with the other of the journals and with one of the tanks and the lid.

12. The blancher of claim 11
 1) wherein the first journal seal is disposed between i) the lid and the one of the journals and ii) the tank and the one of the journals; and
 2) wherein the second journal seal is disposed between i) the lid and the other of the journals and ii) the tank and the other of the journals.

13. The blancher of claim 11 wherein the first food product receiving chamber seal and the second food product receiving chamber seal comprise a water seal.

14. The blancher of claim 1 wherein the means for introducing the non-liquid heat transfer medium into the chamber comprises a manifold received in the food product receiving chamber.

15. The blancher of claim 14 further comprising an inlet for introducing a liquid heat transfer medium into the food product receiving chamber.

16. A blancher for heating food product using a non-liquid heat transfer medium comprising:
   a) a tank having a pair of spaced apart sidewalls and a pair of spaced apart endwalls;
   b) a lid having a pair of spaced apart sidewalls overlying and in contact with the tank sidewalls and a pair of spaced apart endwalls overlying and in contact with the tank endwalls;
   c) a seal disposed between 1) the tank sidewalls and the lid sidewalls and 2) the tank endwalls and the lid endwalls;
   d) wherein the tank and lid define a food product receiving chamber therebetween having 1) a food product inlet in communication with atmosphere exteriorly of the food product receiving chamber and 2) a food product outlet in communication with atmosphere exteriorly of the food product receiving chamber;
   e) a food product transport mechanism received in the food product receiving chamber that urges food product in the food product receiving chamber toward the food product outlet;
   f) an inlet for introducing the gas or vapor heat transfer medium into the chamber that heats the food product received in the chamber, a vent in communication with the upper portion of the food product receiving chamber to vent atmosphere in the food product receiving chamber exteriorly of the food product receiving chamber.

17. The blancher of claim 16
   1) wherein the food product transport mechanism comprises a rotary auger;
   2) wherein the food product inlet is disposed in one of the endwalls of the tank and the inlet and the food product outlet is disposed in the other of the endwalls of the tank and lid;
   3) a first journal operably connected to the rotary auger and in operable communication with the food product inlet and a second journal operably connected to the rotary auger and in operable communication with the food product outlet; and
   4) a first journal seal disposed between one of the journals and one of the tank endwalls and the lid endwalls providing a gas tight seal therebetween and a second journal seal disposed between the other of the journals and the other of the tank endwalls and lid endwalls providing a gas tight seal therebetween.

18. The blancher of claim 17 wherein the first journal seal is disposed between 1) one of the journals and one of the tank endwalls, and 2) one of the journals and one of the lid endwalls, and the second journal is disposed between 1) the other of the journals and the other of the tank endwalls and 2) the other of the journals and the other of the lid endwalls.

19. The blancher of claim 18 further comprising a perforated drum received in the food product receiving chamber having one end adjacent the food product inlet and carrying one of the journals and another end adjacent the food product outlet and carrying the other of the journals.

20. The blancher of claim 1 wherein the food product inlet is disposed at one end of the food product receiving chamber and the food product outlet is disposed at another end of the food product receiving chamber and further comprising a first rotatable journal operably connected to the rotary food product transport mechanism and extending outwardly from the food product receiving chamber through the food product inlet, a first journal seal disposed between the food product receiving chamber and the first journal, a second rotatable journal operably connected to the rotary food product transport mechanism and extending outwardly from the food product receiving chamber through the food product outlet, and a second journal seal disposed between the food product receiving chamber and the second journal.

21. The blancher of claim 1 wherein the food product receiving chamber comprises:
   1) a tank having a) a pair of spaced apart sidewalls each terminating at an edge and ii) a pair of spaced apart endwalls each terminating at an edge;
   2) a lid having a) a pair of spaced apart sidewalls each terminating at an edge and b) a pair of spaced apart endwalls each terminating at an edge wherein the lid is disposed adjacent the tank such that the lid sidewalls are adjacent the tank sidewalls and the lid endwalls are adjacent the tank endwalls;
   3) a first seal in operable communication with a) one of the tank sidewalls and one of the lid sidewalls b) the other of the tank sidewalls and the other of the lid sidewalls, c) one of the tank endwalls and one of the lid endwalls, and
   4) the other of the tank endwalls and the other of the lid endwalls.

22. A blancher for heating food product using solely a vapor or gas heat transfer medium comprising:
   a) a tank having a pair of spaced apart sidewalls and a pair of spaced apart endwalls wherein each of the endwalls have an arcuate portion;
   b) a lid having a pair of spaced apart sidewalls overlying and in contact with the tank sidewalls and a pair of spaced apart endwalls overlying and in contact with the tank endwalls wherein each of the endwalls have an arcuate portion;
   c) a seal disposed between 1) the tank sidewalls and the lid sidewalls and 2) the tank endwalls and the lid endwalls;
   d) wherein the tank and lid define a food product receiving chamber therewithin 1) with one of the arcuate portions of one of the tank endwalls and one of the arcuate portions of one of the lid endwalls forming a food product inlet and 2) the other of the arcuate portions of the other of the tank endwalls and the other of the arcuate portions of the other of the lid endwalls forming a food product outlet;
   e) a generally cylindrical perforate drum received in the food product receiving chamber having a generally cylindrical journal at one end in communication with the food product inlet and a generally cylindrical journal at another end in communication with the food product outlet;
   f) a first upper journal seal disposed between one of the tank endwalls and one of the journals and a first lower journal seal disposed between one of the lid endwalls and the one of the journals;
   g) a second upper journal seal disposed between the other of the tank endwalls and the other of the journals and a second lower journal seal disposed between the other of the lid endwalls and the other of the journals;

h) a rotary auger received in the drum for urging food product toward the food product outlet; and i) an inlet for introducing the non-liquid heat transfer medium into the chamber that heats food product received in the chamber, a vent from an upper portion of said chamber for venting atmosphere from said blancher.

23. A method of heating a food product with a rotary blancher comprising:

a) a rotary blancher including a food product receiving chamber that is sealed and which has a food product inlet and a food product outlet in communication with an atmosphere exterior of the chamber, a food product transport mechanism received in the food product receiving chamber for urging the food product toward the food product outlet, an inlet for introducing a non-liquid heat transfer medium into the food product receiving chamber;

b) introducing food product into the food product receiving chamber;

c) introducing a non-liquid heat transfer medium into the food product receiving chamber;

d) venting a portion of an atmosphere from within the food product receiving chamber to the atmosphere exterior of the food product receiving chamber creating a negative pressure differential within the food product receiving chamber relative to the atmosphere exterior of the food product receiving chamber for preventing flow of atmosphere within the food product receiving chamber out the food product inlet or the food product outlet;

e) heating the food product in the food product receiving chamber;

f) urging the food product in the food product receiving chamber toward the outlet; and g) removing the food product from the food product receiving chamber.

24. The method of claim 23 wherein 1) during step b) food product is continuously introduced into the food product receiving chamber, and 2) during step c) the non-liquid heat transfer medium is continuously introduced into the food product receiving chamber.

25. The method of claim 24 wherein during step f) food product is continuously removed from the food product receiving chamber.

26. The method of claim 24 wherein a portion of the atmosphere from within the food product receiving chamber is continuously vented to the atmosphere exterior of the food product receiving chamber.

27. The method of claim 26 wherein the non-liquid heat transfer medium is continuously introduced into the food product receiving chamber at a flow rate and a portion of the atmosphere from within the food product receiving chamber is continuously vented to the atmosphere exterior of the food product receiving chamber at a flow rate between about 5% and about 30% of the flow rate of the non-liquid heat transfer medium.

28. The method of claim 23 wherein 1) during step b) food product is continuously introduced into the food product receiving chamber, and 2) during step c) the non-liquid heat transfer medium is continuously introduced into the food product receiving chamber.

29. The method of claim 23 wherein during step b) the non-liquid heat transfer medium is introduced into the food product receiving chamber at a flow rate and further comprising the step of venting a portion of the atmosphere from within the food product receiving chamber to the atmosphere exterior of the food product receiving chamber at a flow rate between about 5% and about 30% of the flow rate of the non-liquid heat transfer medium.

30. The method of claim 23 wherein the non-liquid heat transfer medium comprises a vaporous heat transfer medium.

31. The method of claim 30 wherein the vaporous heat transfer medium comprises steam.

32. The method of claim 23 wherein the food product transport mechanism comprises an auger and during step e) the auger is rotated.

33. The method of claim 32 wherein the auger is disposed in a drum received in the food product receiving chamber with the drum having a pair of outwardly extending journals with one of the journals in communication with the food product inlet and the other of the journals in communication with the food product outlet.

34. The method of claim 33 wherein during step e) the drum, the journals, and the auger are rotated.

35. The method of claim 33 wherein the food product receiving chamber comprises 1) a tank and a lid having i) an open position and ii) a closed position wherein the lid overlies the tank; 2) a seal disposed between the tank and the lid when the lid is in its closed position; and 3) a vent for withdrawing atmosphere from within the food product receiving chamber when the lid is in its closed position.

36. The method of claim 34 wherein during step e) the drum, the journals, and the auger are rotated substantially in unison.

37. The method of claim 32 wherein step c) comprises introducing a liquid heat transfer medium into the food product receiving chamber in a second mode of operation of the blancher.

38. The method of claim 37 wherein step c) comprises introducing a liquid heat transfer medium and one of a non-liquid heat transfer medium in a third mode of operation of the blancher.

39. The method of claim 23 wherein the food product receiving chamber comprises 1) a tank and a lid having i) an open position and ii) a closed position wherein the lid overlies the tank; 2) a seal disposed between the tank and the lid when the lid is in its closed position; and 3) a vent for withdrawing atmosphere from within the food product receiving chamber when the lid is in its closed position.

40. The method of claim 23 wherein steps b), c), d) and e) occur substantially simultaneously.

41. A method of heating a food product with a rotary blancher comprising:

a) a rotary blancher including a food product receiving chamber that is sealed and which has a food product inlet and a food product outlet in communication with an atmosphere exterior of the chamber, a food product transport mechanism received in the food product receiving chamber for urging the food product toward the food product outlet, an inlet for introducing a non-liquid heat transfer medium into the food product receiving chamber;

b) introducing food product into the food product receiving chamber:

c) urging the food product in the food product receiving chamber toward the food product outlet;

d) venting a portion of an atmosphere from within the food product receiving chamber to the atmosphere exterior of the food product receiving chamber creating a negative pressure differential within the food product receiving chamber relative to the atmosphere exterior of the food product receiving chamber for preventing flow of atmosphere within the food product receiving chamber out the food product inlet or the food product outlet;

d) operating in one of 1) a first mode wherein solely a non-liquid heat transfer medium is introduced into the food product receiving chamber heating the food product, 2) a second mode wherein solely a liquid heat transfer medium is introduced into the food product receiving chamber heating the food product, and 3) a third mode wherein a combination of i) a liquid heat transfer medium and ii) a non-liquid heat transfer medium is introduced into the food product receiving chamber heating the food product; and e) removing the food product from the food product receiving chamber.

* * * * *